Dec. 12, 1950

J. C. SPINDLER 2,533,529

WIDE BAND ANTENNA

Filed Dec. 27, 1949

JOSEPH C. SPINDLER
*INVENTOR.*

BY Francis W. Crotty
HIS ATTORNEY

Patented Dec. 12, 1950

2,533,529

UNITED STATES PATENT OFFICE 2,533,529

WIDE BAND ANTENNA

Joseph C. Spindler, Chicago, Ill., assignor to Zenith Radio Corporation, a corporation of Illinois Application December 27, 1949, Serial No. 135,146

10 Claims. (Cl. 250—33)

This invention relates to a wide-band antenna and more particularly to one operable over two frequency ranges spaced from one another in the frequency spectrum.

As presently standardized by the Federal Communications Commission, those portions of the frequency spectrum which are assigned to television service lie in the ranges of from 54 to 88 mcs. and from 174 to 217 mcs. Receivers, adapted to reproduce television signals, employ some form of antenna to intercept signals within these ranges. In general, the efficiency of an antenna is related to its effective electrical length and hence, an antenna which is efficient over each of the two ranges of television frequencies presents a problem of no small proportions, particularly since the two ranges are not harmonically related to one another.

It is an object of this invention, therefore, to provide an antenna which is efficiently operable over two frequency ranges in the frequency spectrum.

It is a further object of the invention to provide a dual-range wide-band antenna which efficiently functions over each of two ranges in the frequency spectrum which are not harmonically related to one another.

In applications where the antenna size is limited, one solution to this problem is to utilize an antenna, the physical length of which is adjustable. Another system provides tuning means for the antenna, other than a size variation. In both these arrangements an antenna adjustment must be made when the receiver is tuned. This imposes an added duty upon the operator of the receiver which generally is objectionable.

It is therefore a further object of this invention to provide a dual-range wide-band antenna which requires no adjustable elements or other tuning means and yet operates efficiently over each range.

After several years of utilizing various forms of outdoor antennas, it was found that for many receiver localities within the service area of a group of television stations (usually centrally located in the various cities) there existed sufficient signal strength to make feasible the use of indoor antennas. Rather than employ an indoor antenna external to the receiver, the art sought a more attractive arrangement in which an antenna is built into the television receiver cabinet. Placing an antenna within the confines of the cabinet introduces new problems which are additional to those afore-enumerated. For instance, the available space is quite limited and in fact is considerably smaller than that occupied by most outdoor antenna systems. Further, omnidirectivity becomes a very desirable feature since, if the antenna has a fixed physical relation with the cabinet proper as is usually the case, it is generally inconvenient for the entire receiver to be oriented for optimum signal response.

Hence, it is another object of this invention to provide a wide-band dual-range antenna which is more compact than prior arrangements.

It is still another object of this invention to provide a wide-band dual-range antenna which is substantially omnidirectional at all frequencies within the operating ranges.

In accordance with the invention a wide-band antenna operable over two frequency ranges spaced from one another in the frequency spectrum comprises a pair of folded dipoles spaced from one another by a distance of approximately one-half wavelength at the center frequency of the higher one of the frequency ranges. The dipoles individually have an effective electrical length of substantially one-half of the afore-mentioned wavelength and individually have terminal portions for connection to a feeder. The antenna also includes a parallel wire transmission line, having feeder terminals in the central portion of one of its conductors, which extends between the terminal portions of the dipoles to constitute a feeder for the dipoles. The antenna further includes a pair of parallel wire transmission-line sections each having an effective electrical length of the order of one quarter of the afore-mentioned wavelength. These transmission-line sections extend from the terminal portions of the respective dipoles and form, in combination with the first-mentioned transmission line, an antenna element having an effective electrical length of the order of one-half wavelength at the center frequency of the other of the frequency ranges.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figure 5:
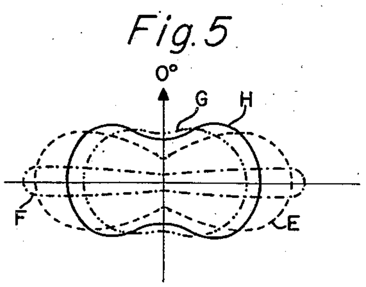

Figs. 4A to 4D, inclusive, represent various modifications of the invention and;

Fig. 5 is a graph showing in polar coordinates a horizontal cross section of the field patterns of the arrangements of Figs. 4A through 4D.

Figures 1, 2, 3:
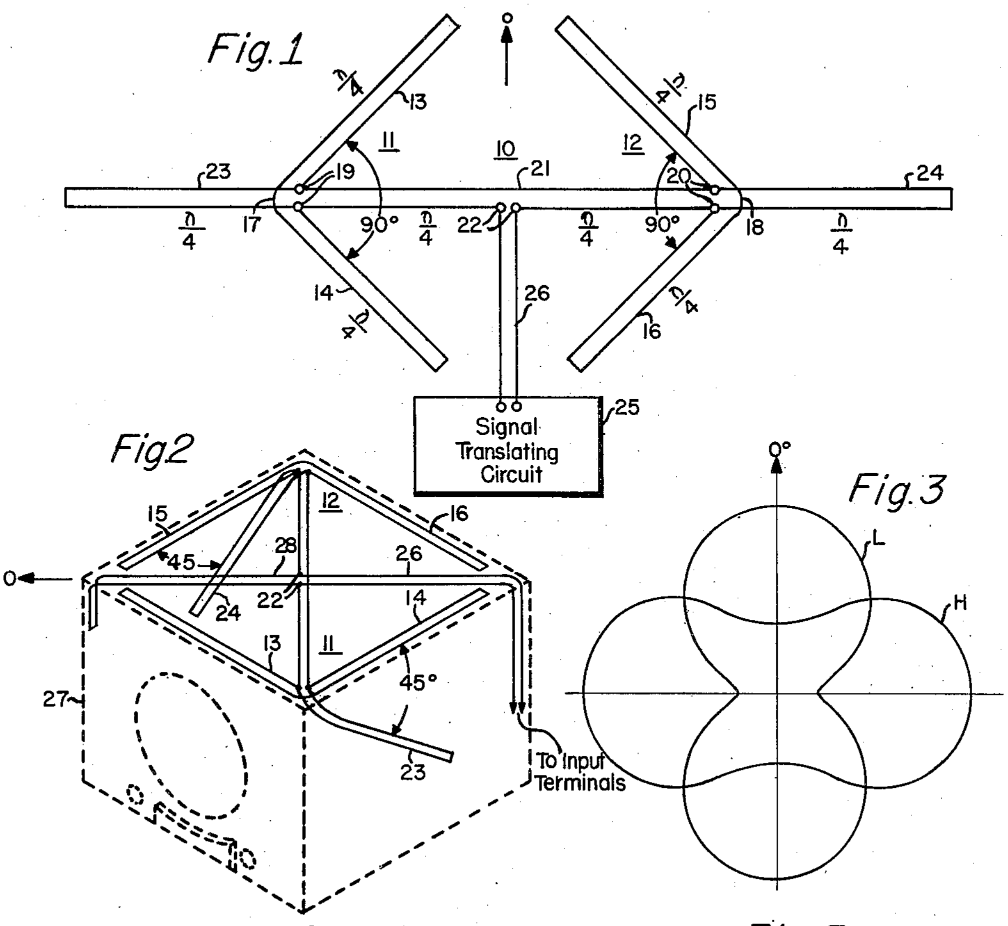
Fig. 1 is a plan view of an antenna structure in accordance with one form of the invention.
Fig. 2 is an oblique view of the outlines of a television receiver cabinet having disposed therein an antenna structure in accordance with the invention.
Fig. 3 illustrates by a polar diagram a horizontal cross section of the field pattern of the antenna structure of Fig. 2.
Figure 4:
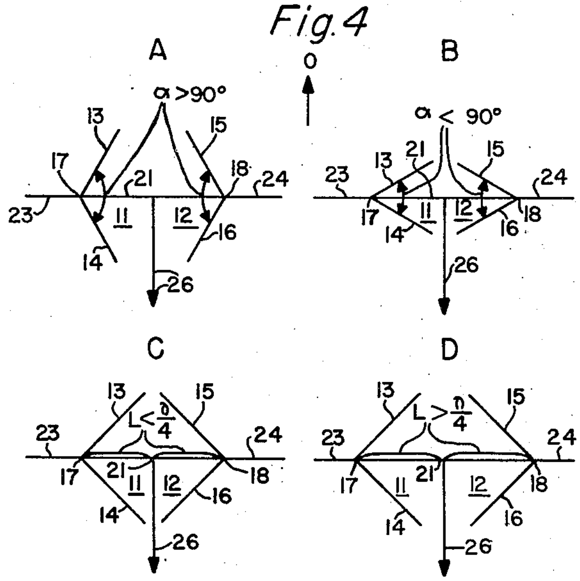

In Fig. 1 the wide-band antenna operable over two frequency ranges spaced from one another in the frequency spectrum is designated by the reference numeral 10. The antenna includes a pair of L-shaped folded dipoles 11 and 12 disposed in a common plane and together enclosing a substantially rectangular area. Each of dipoles 11 and 12 includes a pair of legs 13, 14 and 15, 16 of equal length, disposed at 90° relative to one another and describing equal angles with a line through apices 17 and 18 of dipoles 11 and 12. As will be pointed out hereinafter, the angles subtended by legs 13 and 14 and legs 15 and 16 may be varied to provide a particular field pattern for dipoles 11 and 12.

The apex portions of the dipoles are spaced from one another by a distance of approximately one-half wavelength at the center frequency of the higher one of the intended operating frequency ranges and each dipole has an effective electrical length of substantially one-half of this wavelength because at that wavelength each leg is approximately one-quarter wave. As will be pointed out hereinafter, the spacing between the dipoles 11 and 12 may be varied to provide a particular field pattern.

Each of the dipoles 11 and 12 has at the junction of the legs thereof, or at respective apices 17 and 18, terminal portions 19 and 20. The terminal portions 19 and 20 are disposed in one of the conductors of each of dipoles 11 and 12 and are adapted for connection to a feeder.

A parallel wire transmission line 21, having feeder terminals 22 in the central portion of one of its conductors. is disposed in the plane of the dipoles and extends between the terminal portions 19 and 20. Transmission line 21 constitutes a feeder for the dipoles and preferably lies along the line through apices 17 and 18.

A pair of short circuited parallel wire transmission-line sections 23 and 24, each having an effective electrical length of substantially one-quarter of the wavelength at the center frequency of the higher one of the frequency ranges under consideration, extend from the terminal portions 19 and 20 of dipoles 11 and 12. In the embodiment of Fig. 1 these sections 23 and 24 are disposed in the plane of dipoles 11 and 12 and form in combination with transmission-line section 21 an antenna element having an effective electrical length of the order of one-half wavelength at the center frequency of the other of the intended operating frequency ranges.

Antenna 10 is coupled with a signal translating circuit 25 by a parallel wire transmission line 26. Since the surge impedance of the antenna is approximately that of the feeder line 26, this line may be of any suitable length.

The elements 13, 14, 15, 16, 21, 23, 24 and 26 in this example are constructed of a parallel wire line having a surge impedance of 300 ohms. Each conductor is composed of seven strands of number 28 copper wire, the conductors being embedded in a polyethylene insulation and are spaced by a distance of .3 inch. The overall width of the line, including insulation, is .4 inch and the thickness of the insulation at a point intermediate the conductors is .062 inch.

For convenience of explanation the antenna of Fig. 1 will be treated as if utilized for radiating signals. This is a proper expedient inasmuch as the electrical characteristics of an antenna are the same for transmitting as well as for receiving signals.

Let us first consider the operation of antenna 10 at the center frequency of the higher frequency range. Signals from translator 25 at the center frequency are supplied through feeder 26 to both halves of feeder 21. The left half of feeder 21 supplies signals to dipole 11 through terminals 19 while the right half of feeder 21 supplies signals to dipole 12 via terminals 20. The line sections 23 and 24, coupled to terminals 19 and 20, are one-quarter wavelength short-circuited sections and have little or no effect upon the operation of the antennas 11 and 12. This is apparent since the open end impedance of a one-quarter wavelength shorted line approaches an infinite value whereas the impedance looking into the terminals of a folded dipole is approximately equal to the surge impedance of the feeder.

Each of the L-shaped dipoles 11 and 12 has a radiation pattern which is substantially omnidirectional in the plane of its radiating elements. This pattern includes four lobes of maximum radiation symmetrically disposed at intervals of 90° about a line which bisects the angle of the legs. The minimum field strength of this arrangement is about 70% of the maximum and hence the antenna can be considered as essentially omnidirectional.

When two such antennas are physically spaced from one another by substantially one-half wavelength and excited in like phase the field pattern is distorted from that just described and approaches that of a "figure eight" illustrated by curve H of Fig. 3. This curve is a polar diagram of the field pattern in the plane of the sheet of the drawing, arrow *o* in Fig. 1 indicating the orientation of the antenna corresponding to zero degrees in Fig. 3. For the one-half wavelength of the spacing of dipoles 11 and 12 the minima, which lie at opposite ends of the zero axis, are substantially .4 of the maxima which lie at opposite ends of the line perpendicular to the zero axis.

Considering now the antenna as operated at the center frequency of the lower frequency range, it may be broadly stated that elements 21, 23 and 24 constitute an antenna which has an effective electrical length of the order of one-half wavelength. This is an approximation since the physical length of antenna 23, 21, 24 is substantially equal to one wavelength at the center frequency of higher frequency range and the frequency ranges under consideration are not harmonically related to one another. The impedance of each of the diploes 11 and 12 at terminals 19 and 20 for the signals at the center of the lower frequency range, approaches the magnitude presented by a one-quarter wavelength shorted transmission line. This impedance is considerably higher than that exhibited by the antenna at the junction of sections 23 and 21 and 21 and 24. However, since the effective length of the dipoles 11 and 12 is somewhat smaller than one-quarter wavelength at the center of the lower frequency range their terminal impedance is less than an infinite value. Hence, the dipoles 11 and 12 shunt a small part of the signal voltages which are applied to sections 23 and 24 and thereby tend to resonate the antenna 21—23—24 at a lower frequency than would otherwise result in the absence of the loading contributed by the dipoles. As a result antenna 23, 21, 24 functions substantially as a one-half wave dipole in the lower of the frequency ranges.

The field pattern for a folded dipole, as just described, is that of a "figure eight" with the maxima disposed at right angles to the line of the antenna. The presence of dipoles 11 and 12 tends to distort this pattern and the resulting field pattern approaches that illustrated by curve L of Fig. 3.

In another practical embodiment of the invention shown in Fig. 2 as applied to a television receiver, elements 23 and 24 extend from the same side of the plane of dipoles 11 and 12 and individually define an angle which preferably is not less than 45° with legs 14 and 15, respectively of the dipoles. The received field pattern in the lower range of frequencies is substantially that illustrated by curve L of Fig. 3; arrow *o* in Fig. 2 representing the orientation of zero degrees in Fig. 3. The elements of the antenna in Fig. 2 are enclosed and supported entirely within a cabinet structure 27 and identical elements of this figure are designated similarly to those of Fig. 1. Cabinet 27 also encloses the various component parts (not shown) of a wave signal receiver, here illustrated as a television receiver.

It is within the contemplation of the invention that the sections 23 and 24 may be disposed in various positions relative to the plane of dipoles 11 and 12. For example, the sections may extend in their entirety at right angles to the plane of dipoles 11 and 12. Alternatively, these sections may extend in this direction for a portion of their length and then be disposed along a line at an angle approaching 45° with the legs 14 and 15 respectively of dipoles 11 and 12. The various dispositions which may be employed are dependent upon the particular installation in which the invention is to be utilized. It has been found that too small an angle between the sections 23 and 24 and the plane of the dipoles 11 and 12 tends to distort the field pattern for operation in the higher operating range. Hence in making a particular installation this factor should be observed and may determine the amount of space required by antenna 10.

The form of the invention shown in Fig. 2 includes an element, additional to those described in connection with Fig. 1, which operates to provide a better impedance match at terminals 22 for frequencies within the lower frequency range. Impedance matching may be required since antenna 23, 21, 24 is physically smaller than one-half wavelength in low frequency range and a capacitive impedance may result. This element is a matching stub 28 having a length substantially one-quarter of the wavelength at the center frequency of the higher range. Since section 28 is a shorted one-quarter wavelength line, it has little or no effect upon operation within the higher range; its open-end impedance approaching an infinite value. However, in the lower range the impedance of the matching stub 28 at terminals 22 is substantially inductive which tends to counteract the capacitive impedance of antenna 23, 21, 24. Matching stub 28 is an optional element and its use depends on the degree of reactive mismatch which can be tolerated at terminals 22 for low band operation.

Referring now to Figs. 4A through 4D, there are illustrated various forms which the invention might take in order that the field pattern for the high range of frequencies may be varied from that shown by curve H of Fig. 3. The orientation of the several forms in Fig. 4, indicated by arrow *o* corresponds to zero degrees in Fig. 5. The curve H of Fig. 5 represents the same condition illustrated by curve H of Fig. 3.

Fig. 4A shows an antenna similar to that illustrated in Fig. 1, but the angle subtended by the legs 13, 14 and 15, 16 of dipoles 11 and 12 is greater than 90°. The field pattern for such an arrangement is substantially as shown by curve E of Fig. 5. As compared with curve H it may be seen that the maxima are greater and the minima are smaller. This arrangement, therefore, is useful if greater directivity is desired.

Fig. 4B shows a modification of the invention in which the angle subtended by legs 13, 14 and 15, 16 is less than 90°. The field pattern of this arrangement is as represented by curve F of Fig. 5 and it may be noted that the maxima are still greater and the minima still smaller than those of curve E. This arrangement provides a still greater directivity. In particular, the pattern shows a very much reduced response in the directions normal to the maxima, or in other words a very narrow beam is formed.

Fig. 4C shows a form of the antenna in which the spacing between apices 17 and 18 of the dipoles 11 and 12 is less than one-half wavelength. This arrangement provides a field pattern illustrated by curve G of Fig. 5 and it will be noted that still greater omnidirectivity is afforded than with the arrangements of Figs. 1 or 2.

In Fig. 4D the spacing between the apices 17 and 18 of dipoles 11 and 12 is greater than one-half wavelength and the field distribution pattern for this arrangement is approximately that shown by curve E of Fig. 5.

The several arrangements of Figs. 4A–4D, inclusive, have particular usefulness depending upon the space limitations in which the antenna is employed. Furthermore, each of the forms has a particular field pattern and is suited to certain applications depending upon the nature of the required field pattern.

In operating the antenna on either of the two frequency ranges inasmuch as the radiating elements for each of the ranges is composed of one or more folded dipoles, there is no tuning or matching required. Further, since folded dipoles are utilized the characteristic advantage of such an antenna, namely its good efficiency over a wide range of operating frequencies, is utilized to its fullest extent.

As pointed out hereinbefore, the antenna operates on each of the two operating ranges in such a manner that the particular set of elements being utilized are not detrimentally affected by any portion or portions of the elements utilized for the other range.

It follows then that the invention affords a dual-range wide-band antenna which is efficiently operable over two ranges in the frequency spectrum which are not harmonically related to one another. Furthermore, the antenna has no adjustable elements and there are no necessary tuning means for providing efficient operation in each of the ranges. Also important, the antenna is much more compact than prior arrangements and is substantially omnidirectional at all frequencies within the operating frequency ranges.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A wide-band antenna operable over two frequency ranges spaced from one another in the frequency spectrum comprising: a pair of folded dipoles spaced from one another by a distance of approximately one-half wavelength at the center frequency of the higher one of said frequency ranges, individually having an effective electrical length of substantially one-half of said wavelength, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges 2. A wide-band antenna operable over two frequency ranges spaced from one another in the frequency spectrum comprising: a pair of folded dipoles spaced from one another by a distance of approximately one-half wavelength at the center frequency of the higher one of said frequency ranges, individually including angularly disposed legs which together have an effective electrical length of substantially one-half of said wavelength, and individually having terminal portions for connection to a feeder; a parallel-wire transmission line, having feeder terminals in the central portion of one of its conductors extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

3. A wide-band antenna operable over two frequency ranges spaced from one another in the frequency spectrum comprising: a pair of folded dipoles spaced from one another by a distance of approximately one-half wavelength at the center frequency of the higher one of said frequency ranges, individually including a pair of legs disposed at 90° relative to one another and which together have an effective electrical length of substantially one-half of said wavelength, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

4. A wide-band antenna operable over two frequency ranges spaced from one another in the frequency spectrum comprising: a pair of L-shaped folded dipoles spaced from one another by a distance of approximately one-half wavelength at the center frequency of the higher one of said frequency ranges, individually including legs of equal length which together have an effective electrical length of substantially one-half of said wavelength, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

5. A wide-band antenna operable over two frequency ranges spaced from one another in the frequency spectrum comprising: a pair of L-shaped folded dipoles disposed in a common plane and together enclosing a substantially rectangular area with the apices of said L's spaced from one another by a distance of approximately one-half wavelength at the center frequency of the higher one of said frequency ranges, said dipoles individually including legs of equal length which together have an effective electrical length of substantially one-half of said wavelength, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

6. A wide-band antenna operable over two frequency ranges spaced from one another in the frequency spectrum comprising: a pair of L-shaped folded dipoles spaced from one another along a line through the apices thereof by a distance of approximately one-half wavelength at the center frequency of the higher one of said frequency ranges, individually including legs of equal length which together have an effective electrical length of substantially one-half of said wavelength and which describe equal angles with said line through said apices of said dipoles, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

7. A wide-band antenna operable over two frequency ranges spaced from one another in the frequency spectrum comprising: a pair of L-shaped folded dipoles spaced from one another along a line through the apices thereof by a distance of approximately one-half wavelength at the center frequency of the higher one of said frequency ranges, individually including legs of equal length which together have an effective electrical length of substantially one-half of said wavelength and which describe equal angles with said line through said apices of said dipoles, and individually having terminal portions at the junction of said legs thereof for connection to a feeder; a parallel-wire transmission line, having feeder terminals in the central portion of one of its conductors, extending along said line through said apices of said dipoles and between said terminal portions of said dipoles to constitute a feeder for said dipoles; and a pair of short circuited parallel-wire transmission-line sections, each having an effective electrical length of substantially one-quarter of said wavelength, extending from said terminal portions of said dipoles, respectively, and forming in combination with said first-mentioned transmission line an antenna element having an effective electrical length of the order of one-half wavelength at the center frequency of the other of said frequency ranges.

8. A wide-band antenna operable over two frequency ranges spaced from one another in the frequency spectrum comprising: a pair of folded dipoles spaced from one another by a distance of approximately one-half wavelength at the center frequency of the higher one of said frequency ranges, individually having an effective electrical length of substantially one-half of said wavelength, and individually having terminal portions for connection to a feeder; a parallel-wire transmission line, having feeder terminals in the central portion of one of its conductors, extending between said terminal portions of said dipoles to constitute a feeder for said dipoles; and a pair of short circuited parallel-wire transmission-line sections, each having an effective electrical length of substantially one-quarter of said wavelength, extending from said terminal portions of said dipoles, respectively, in oblique directions relative to said first-mentioned transmission line, and forming in combination with said first-mentioned transmission line an antenna element having an effective electrical length of the order of one-half wavelength at the center frequency of the other of said frequency ranges.

9. A wide-band antenna enclosed within the cabinet structure of a wave signal receiver operable over two frequency ranges spaced from one another in the frequency spectrum comprising: a pair of folded dipoles disposed in the plane of the top of said cabinet spaced from one another by a distance of approximately one-half wavelength at the center frequency of the higher one of said frequency ranges, individually having an effective electrical length of substantially one-half of said wavelength, and individually having terminal portions for connection to a feeder; a parallel-wire transmission line, having feeder terminals in the central portion of one of its conductors, disposed in said plane and extending between said terminal portions of said dipoles to constitute a feeder for said dipoles; and a pair of short circuited parallel-wire transmission-line sections, each having an effective electrical length of substantially one-quarter of said wavelength, extending in respective directions away from the same side of said plane and from said terminal portions of said dipoles, respectively, and forming in combination with said first-mentioned transmission line an antenna element having an effective electrical length of the order of one-half wavelength at the center frequency of the other of said frequency ranges.

10. A wide-band antenna enclosed within the cabinet structure of a wave signal receiver operable over two frequency ranges spaced from one another in the frequency spectrum comprising: a pair of folded dipoles disposed in the plane of the top of said cabinet spaced from one another by a distance of approximately one-half wavelength at the center frequency of the higher one of said frequency ranges, individually having an effective electrical length of substantially one-half of said wavelength, and individually having terminal portions for connection to a feeder; a parallel-wire transmission line, having feeder terminals in the central portion of one of its conductors, disposed in said plane and extending between said terminal portions of said dipoles to constitute a feeder for said dipoles; and a pair of short circuited parallel-wire transmission-line sections, each having an effective electrical length of substantially one-quarter of said wavelength, extending interiorly relative to said cabinet from said terminal portions of said dipoles, respectively, individually defining by at least a portion thereof an angle of no less than 45° with one of said dipoles, and forming in combination with said first-mentioned transmission line an antenna element having an effective electrical length of the order of one-half wavelength at the center frequency of the other of said frequency ranges.

JOSEPH C. SPINDLER.

No references cited.